UNITED STATES PATENT OFFICE.

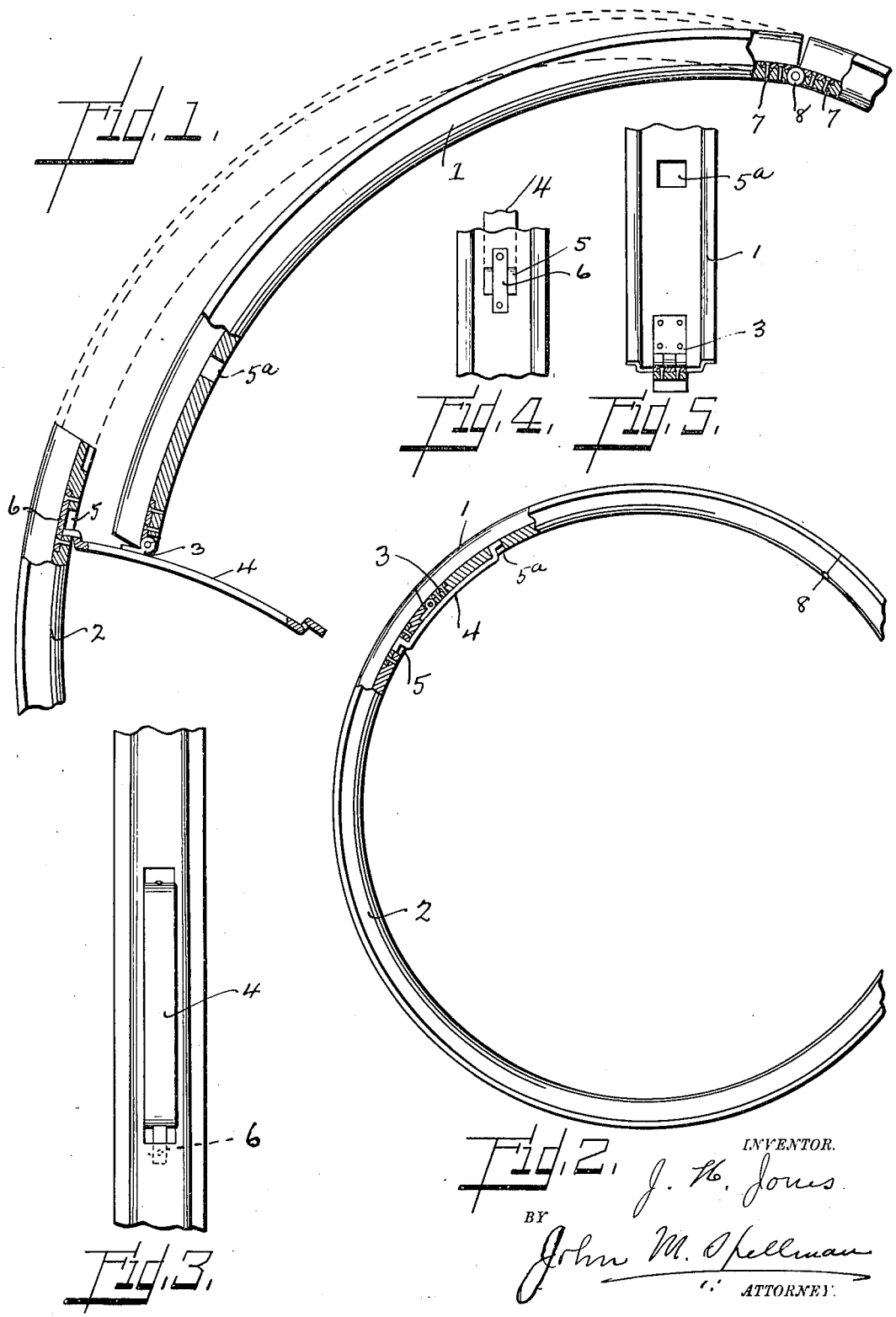

JOSEPH H. JONES, OF COVINGTON, TEXAS.

DEMOUNTABLE TIRE-RIM.

1,291,537.　　　　Specification of Letters Patent.　　Patented Jan. 14, 1919.

Application filed May 12, 1917. Serial No. 168,140.

*To all whom it may concern:*

Be it known that I, JOSEPH H. JONES, a citizen of the United States, residing at Covington, in the county of Hill and State of Texas, have invented certain new and useful Improvements in Demountable Tire-Rims, of which the following is a specification.

My invention has relation to an improvement in rims for vehicle wheels and in such connection it relates more particularly to the rims of automobile wheels upon or from which resilient tires may be readily mounted or removed.

The principal object of my invention is to provide an automobile wheel rim which is demountable and which is so constructed that when removed from the wheel a segment of the rim can be swung inwardly thereby attaining an easy and quick removal of the tire from the rim, and vice versa.

Another object of my invention is to provide an automobile tire rim of the character described which is simple in construction, strong, durable and one which is not of expensive manufacture.

The nature and scope of my invention will be more fully understood from the following description taken in connection with the accompanying drawings forming part hereof, in which—

Figure 1 is a side view of the swinging segment and a portion of the rim a part of which is shown in cross-section, the segment being swung inwardly to show the mode of operation.

Fig. 2 is a side elevational view of the rim, the means for locking the separable ends shown in cross-section.

Fig. 3 is an underneath plan view of that portion of the rim which swings inwardly, showing its appearance when the two separable ends are locked together.

Fig. 4 is a plan view of this section of the rim, and

Fig. 5 is an underneath plan view of a part of the inner circumference of the rim showing the hinge connected thereto.

Again referring to the drawings: 1 represents the rim segment and 2 the larger or principal portion of the rim, the two parts together constituting the completed rim. 3 is a hinge connected at one butt by screws to the rim segment the connection being countersunk in the outer periphery of the rim body. The other end or butt is connected to a metal strip or bar 4 about midway between a point in the center of the strip and a slot 5 in the stationary end of the rim. Both ends of this strip 4 are turned downward at right angles to the slightly curved surface of the strip and again turned outwardly, the outwardly turned end having longitudinal relation to the strip, thus forming a suitable shape to correspond or interlock with the slots 5$^a$ in hinged section 3 and 5 in main body 2 of the rim. 6 represents a metal strap countersunk in the rim to partially cover slot 5 and prevents the end of strip 4 from being pushed through said slot when the rim segment is opened. 7 is a slot or depression countersunk in the rim and in which the flat portion of the hinge 3 rests when the segment is in place to form a complete circular rim. 8 represents the pintle of the hinge connecting the swinging segment to the rim, the pintle of this hinge being countersunk in the rim to form a smooth surface.

Having thus described my invention, what I claim as new and desire to secure by Letters Patent is:

In a tire rim formed of a main circular portion and a segmental portion hinged at one end to said main portion, a metal strip mounted to swing from a point near the free end of the segmental portion, said strip being upturned at each end to enter and interlock with complemental slots formed respectively in the main and segmental portions of said rim.

In testimony whereof I have signed my name to this specification in the presence of two subscribing witnesses.

JOSEPH H. JONES.

Witnesses:
M. T. DAVIS,
J. L. COWAN.